Patented Oct. 10, 1950

2,525,722

UNITED STATES PATENT OFFICE 2,525,722

ISOMERS OF PHTHALOYL CHLORIDE

Norman Rabjohn, Akron, Ohio, assignor to Wingfoot Corporation, Akron, Ohio, a corporation of Delaware No Drawing. Application March 8, 1947,
Serial No. 733,434

8 Claims. (Cl. 260—544)

This invention relates to a novel method of producing pure phthaloyl chlorides from trichloromethylbenzoyl chlorides.

The principal starting material leading to the preparation of the three isomeric phthaloyl chlorides is xylene which is available in large quantities as a mixture of the three isomeric forms. Because of the similarity of the chemical and physical properties separation of the isomeric xylenes is quite difficult. Once the separation is achieved any of the isomers can be chlorinated in the presence of light and hydrolyzed. Although o-xylene can be separated from the other isomers by distillation with an elaborate column, the para- and meta-xylenes can only be separated by complex and industrially impracticable chemical and physical methods. Similarly, the mixture of isomeric phthaloyl chlorides obtained by treating commercial xylene by the above-described chlorination and hydrolysis cannot be separated.

In co-pending application Serial No. 733,433, filed March 8, 1947, there is described and claimed a method of preparing pure isophthaloyl chloride and pure terephthaloyl chloride by first crystallizing out the p-bis(trichloromethyl) benzene, and finally removing the m-bis(trichloromethyl) benzene from the residue by distillation.

Although some alkyl-substituted benzenes, for example, toluene, can be converted readily to the corresponding carboxylic acid by air oxidation, such procedures are not practicable for the oxidation of xylene because of the difficulty of separating the resultant dicarboxylic acids from the oxidation catalysts required for the conversion. The air oxidation of xylene, as it is usually practiced involves a carefully controlled technique whereby the reaction is stopped after tolualdehydes are formed, these aldehydes being volatile and separable from the reaction mass and from each other with difficulty. Toluic acid may be prepared by subsequent further oxidation of the tolualdehydes.

The purpose of the present invention is to provide an improved method for preparing the various isomeric phthaloyl chlorides from the tolualdehydes and the toluic acids by means of a common intermediate compound, trichloromethylbenzoyl chloride. A further purpose of this invention is to provide a new method of converting trichloromethylbenzoyl chloride into the corresponding isomer of phthalic acid in very high yields.

Toluic acid may be converted to toluoyl chloride by means of thionyl chloride and the toluoyl chloride and tolualdehyde may be chlorinated to trichloromethylbenzoyl chloride in accordance with the following equations:

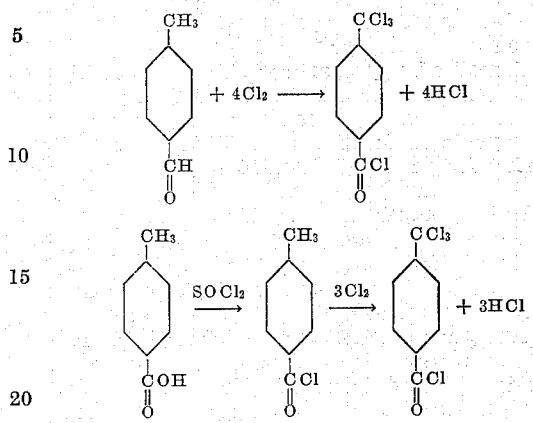

It is also known that the trichloromethyl benzoyl chloride may be converted to the corresponding phthaloyl chloride by hydrolysis. The present invention relates to an improved method of hydrolysis by which much higher yields of product can be obtained. The new hydrolysis method is conducted in the presence of a dibasic acid capable of forming an acid anhydride by heating. Although many dibasic acids of this type are known, for example, o-phthalic acid, succinic acid, glutaric acid, the naphthalene dicarboxylic acids having the carboxylic acid groups on adjacent carbon atoms, and o-diphenic acid, the more volatile dicarboxylic acids, such as maleic acid, are preferred.

The invention may be conducted in conventional chemical retorts capable of resisting the action of the hydrogen chloride evolved. It is usually desirable to charge the trichloromethylbenzoyl chloride into the retort and add the anhydride-forming dibasic acid at such a rate that the reaction can be maintained under control. The new method preferably utilizes a metal halide catalyst, ferric chloride, zinc chloride, antimony trichloride, and stannic chloride being preferred, or an acid catalyst, such as sulfuric acid, or p-toluene sulfonic acid.

The isomeric phthaloyl chlorides prepared in accordance with this invention are valuable chemical reagents, and the meta and para isomers are especially valuable in the preparation of high molecular weight linear polyesters. The invention is operable with a mixture of isomers as well as the individual compounds.

Further details of the practice of this invention are set forth with respect to the following example.

*Example*

A mixture of 206.4 parts by weight of p-trichloromethylbenzoyl chloride and 1.5 parts by weight of zinc chloride was charged to a glass retort and heated to a temperature between 135 and 140° C. While stirring the mixture, 94 parts by weight of maleic acid were added portionwise at a rate which enabled control of the hydrogen chloride evolution. After all of the maleic acid had been added, the mixture was stirred for 15 minutes to insure the completion of the reaction. The liquid reactants were then decanted from the solid catalysts and distilled in vacuo. An 86 percent yield of terephthaloyl chloride (M. P. 80 to 82° C.) was recovered.

Although this invention has been described with respect to a specific example, it is not intended that the details thereof shall be construed as a limitation upon the scope of the invention except to the extent incorporated in the following claims.

I claim:

1. A method of preparing a phthaloyl chloride which comprises heating a trichlormethylbenzoyl chloride in the presence of a dicarboxylic acid capable of forming an anhydride, and recovering the phthaloyl chloride.

2. A method of forming a phthaloyl chloride which comprises heating trichloromethylbenzoyl chloride in the presence of a dicarboxylic acid capable of forming an anhydride and a hydrolysis catalyst, and fractionally distilling the product to recover the phthaloyl chloride.

3. A method of preparing a phthaloyl chloride which comprises heating trichloromethylbenzoyl chloride with maleic acid in the presence of a hydrolysis catalyst, and subsequently distilling the product in vacuo to recover the phthaloyl chloride.

4. A method of preparing a phthaloyl chloride which comprises heating trichloromethylbenzoyl chloride with maleic acid in the presence of zinc chloride, and subsequently distilling the product in vacuo to recover the phthaloyl chloride.

5. A method of preparing terephthaloyl chloride which comprises heating p-trichloromethylbenzoyl chloride in the presence of a dicarboxylic acid capable of forming an anhydride, and recovering the terephthaloyl chloride.

6. A method of preparing isophthaloyl chloride which comprises heating m-trichloromethylbenzoyl chloride in the presence of a dicarboxylic acid capable of forming an anhydride, and recovering the isophthaloyl chloride.

7. A method of preparing terephthaloyl chloride which comprises heating p-trichloromethylbenzoyl chloride in the presence of maleic acid, and recovering the terephthaloyl chloride.

8. A method of preparing isophthaloyl chloride which comprises heating m-trichloromethylbenzoyl chloride in the presence of maleic acid, and recovering the isophthaloyl chloride.

NORMAN RABJOHN.

REFERENCES CITED

The following references are of record in the file of this patent:

UNITED STATES PATENTS

| Number | Name | Date |
| --- | --- | --- |
| 1,557,154 | George | Oct. 13, 1925 |
| 1,880,169 | Bennett | Sept. 27, 1932 |
| 1,921,767 | Mills | Aug. 8, 1933 |
| 1,965,556 | Mills | July 3, 1934 |

FOREIGN PATENTS

| Number | Country | Date |
| --- | --- | --- |
| 455,668 | Great Britain | 1936 |
| 820,697 | France | Nov. 16, 1937 |

OTHER REFERENCES

Karrer: "Organic Chemistry," Elsevier Publishing Co., Inc., New York, N. Y., 1946, 2nd ed., p. 268.